US010331965B2

(12) United States Patent
Li

(10) Patent No.: US 10,331,965 B2
(45) Date of Patent: Jun. 25, 2019

(54) METHOD, DEVICE AND COMPUTER-READABLE MEDIUM FOR UPDATING SEQUENCE OF FINGERPRINT TEMPLATES FOR MATCHING

(71) Applicant: GUANGDONG OPPO MOBILE TELECOMMUNICATIONS CORP. LTD., Dongguan, Guangdong (CN)

(72) Inventor: Bin Li, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 15/703,143

(22) Filed: Sep. 13, 2017

(65) Prior Publication Data
US 2018/0089520 A1    Mar. 29, 2018

(30) Foreign Application Priority Data
Sep. 27, 2016  (CN) .......................... 2016 1 0861262

(51) Int. Cl.
G06K 9/00      (2006.01)
G06F 21/32     (2013.01)

(52) U.S. Cl.
CPC ......... *G06K 9/00926* (2013.01); *G06F 21/32* (2013.01); *G06K 9/00013* (2013.01); *G06K 9/00087* (2013.01)

(58) Field of Classification Search
CPC .......... G06K 9/00926; G06K 9/00013; G06K 9/00087; G06F 21/32
(Continued)

(56) References Cited

U.S. PATENT DOCUMENTS

2016/0125223 A1    5/2016  Boshra et al.

FOREIGN PATENT DOCUMENTS

CN    105160303 A    12/2015
CN    105389566 A    3/2016
(Continued)

OTHER PUBLICATIONS

International Search Report dated Oct. 10, 2017 for Application No. PCT/CN2017/096474.
(Continued)

*Primary Examiner* — Amandeep Saini
(74) *Attorney, Agent, or Firm* — Ladas & Parry LLP

(57) ABSTRACT

A method for updating a sequence of fingerprint templates for matching is disclosed, comprising: acquiring a fingerprint image; comparing the fingerprint image with a preset fingerprint template selected from N preset fingerprint templates stored in advance, sequentially in a predetermined sequence of the N preset fingerprint templates for matching, each preset fingerprint template corresponding to a matching score; adjusting the matching score corresponding to an ith preset fingerprint template, when the fingerprint image matches the ith preset fingerprint template; and sequencing the N preset fingerprint templates in a sequence of the matching score corresponding to the respective preset fingerprint template from high to low, to obtain a updated sequence of the N preset fingerprint templates, in which a next acquired fingerprint image is compared with the preset fingerprint template selected from N preset fingerprint templates sequentially for matching.

17 Claims, 7 Drawing Sheets

(58) Field of Classification Search
USPC .......................................................... 382/125
See application file for complete search history.

(56) References Cited

FOREIGN PATENT DOCUMENTS

| | | | | |
|---|---|---|---|---|
| CN | 105844129 A | | 8/2016 | |
| CN | 105912919 A | | 8/2016 | |
| CN | 106446841 A | | 2/2017 | |
| CN | 105844129 B | * | 1/2018 | ............... G06K 9/00 |
| EP | 3 229 176 | | 10/2017 | |
| WO | 2016/015034 A1 | | 1/2016 | |
| WO | 2016/127680 A1 | | 8/2016 | |

OTHER PUBLICATIONS

European Search Report dated Feb. 22, 2018 for Application No. EP 17 19 1541.
English abstract of CN 106446841 A.
English abstract of CN 105844129 A.
English abstract of CN 105912919 A.
English abstract of CN 105389566 A.
English abstract of CN 105160303 A.
Freni, B., et al., "Replacement Algorithms for Fingerprint Template Update", Image Analysis and Recognition: Lecture Noted in Computer Science, Jun. 25, 2008, pp. 884-893.
Scheidat, T., et al., Automatic Template Update Strategies for Biometrics:, Technical Report, May 1, 2007, 5 pages.

* cited by examiner

METHOD, DEVICE AND COMPUTER-READABLE MEDIUM FOR UPDATING SEQUENCE OF FINGERPRINT TEMPLATES FOR MATCHING

CROSS REFERENCE TO RELATED APPLICATIONS

This application claims priority to Chinese patent application No. 201601861262.6 titled "METHOD AND TERMINAL FOR UPDATING A SEQUENCE OF FINGERPRINT TEMPLATES FOR MATCHING", and tiled on Sep. 27, 2016, the disclosures for which are hereby incorporated herein in their entireties by reference.

FIELD

The present disclosure relates generally to the technical field of electronic device, and more particularly, to a method, device and computer-readable medium for updating a sequence of fingerprint templates for matching.

BACKGROUND

With the rapid development of information technology, the use of terminal devices, such as mobile phone and tablet device, become more and more popular, and the requirements for the terminal devices' performances become more and more critical. As a standard feature of the terminal device, the feature of using a fingerprint to unlock has been favored by major terminal device manufacturers. During using the fingerprint to unlock, a fingerprint image may be acquired firstly, and the fingerprint image may be compared with fingerprint templates. If the fingerprint image matches a fingerprint template, an unlocking operation may be performed; and if the fingerprint image does not match any fingerprint template, the user is prompted to press the fingerprint reader again. There generally should not be only one fingerprint template, but a plurality of fingerprint templates. In such case, there is generally one sequence in which any one of the plurality of fingerprint templates are selected from the plurality of fingerprint templates for comparison during the matching. The sequence is generally designed so that a fingerprint template recorded earlier should be selected earlier for comparison. Such sequence is extremely inflexible, reducing the efficiency of using the fingerprint to unlock.

SUMMARY

The present disclosure provides a method, device and computer-readable medium for updating a sequence of fingerprint templates for matching, to improve the efficiency of using the fingerprint to unlock.

According to one aspect of the disclosure, a method for updating a sequence of fingerprint templates for matching is provided, including:

acquiring a fingerprint image;

comparing the fingerprint image with a preset fingerprint template selected from N preset fingerprint templates stored in a device in advance, sequentially in a predetermined sequence of the N preset fingerprint templates for matching, any one of the N preset fingerprint templates corresponding to a matching score, N being a positive integer greater than 1;

adjusting the matching score corresponding to an ith preset fingerprint template, when the fingerprint image matches the ith preset fingerprint template, the ith preset fingerprint template being one of the N preset fingerprint templates; and sequencing the N preset fingerprint templates in a sequence of the matching score corresponding to the respective preset fingerprint template from high to low, to obtain a updated sequence of the N preset fingerprint templates, in which a next acquired fingerprint image is compared with the preset fingerprint template selected from N preset fingerprint templates sequentially for matching.

According to an additional aspect of the disclosure, a device is provided, including:

one or more computer processors;

a memory; and one or more programs, wherein the one or more programs are stored in the memory and configured to be executed by the one or more processors, the one or more programs including:

an acquisition unit, configured to acquire a fingerprint image;

a matching unit, configured to compare the fingerprint image with a preset fingerprint template selected from N preset fingerprint templates stored in a device in advance, sequentially in a predetermined sequence of the N preset fingerprint templates for matching, any one of the N preset fingerprint templates corresponding to a matching score, N being a positive integer greater than 1;

an adjustment unit, configured to adjust the matching score corresponding to an ith preset fingerprint template, when the fingerprint image matches the ith preset fingerprint template, the ith preset fingerprint template being one of the N preset fingerprint templates; and a sequencing unit, configured to sequence the N preset fingerprint templates in a sequence of the matching score corresponding to the respective preset fingerprint template from high to low, to obtain a updated sequence of the N preset fingerprint templates, in which a next acquired fingerprint image is compared with the preset fingerprint template selected from N preset fingerprint templates sequentially for matching.

According to a further aspect of the disclosure, a computer-readable storage medium for storing computer executable instructions is provided. The computer executable instructions are used to control a computer to execute a method for updating a sequence of fingerprint templates for matching, the method including:

acquiring a fingerprint image;

comparing the fingerprint image with a preset fingerprint template selected from N preset fingerprint templates stored in a device in advance, sequentially in a predetermined sequence of the N preset fingerprint templates for matching, any one of the N preset fingerprint templates corresponding to a matching score, N being a positive integer greater than 1;

adjusting the matching score corresponding to an ith preset fingerprint template, when the fingerprint image matches the ith preset fingerprint template, the ith preset fingerprint template being one of the N preset fingerprint templates; and sequencing the N preset fingerprint templates in a sequence of the matching score corresponding to the respective preset fingerprint template from high to low, to obtain a updated sequence of the N preset fingerprint templates, in which a next acquired fingerprint image is compared with the preset fingerprint template selected from N preset fingerprint templates sequentially for matching.

According to the above method, device and computer-readable storage medium, when the fingerprint image matches any one of the preset fingerprint templates, the matching score corresponding to the matched preset fingerprint template may be adjusted, and the preset fingerprint templates may be sequenced in a sequence of the matching score corresponding to the respective preset fingerprint template from high to low to obtain a updated sequence of the preset fingerprint templates. A next acquired fingerprint image may be compared with the preset fingerprint template selected from preset fingerprint templates sequentially in the new sequence for matching, so the efficiency of using the fingerprint to unlock is improved.

BRIEF DESCRIPTION OF THE DRAWINGS

In order to illustrate the technical solutions of the present disclosure more clearly, a brief description of the accompanying drawings used herein is given below. Obviously, the drawings listed below are only examples and a person skilled in the art should be noted that, other drawings can also be obtained on the basis of these exemplary drawings without creative activity.

FIG. 4b is a schematic diagram illustrating a configuration of an adjustment of the device as shown in FIG. 4a.

FIG. 4c is a schematic diagram illustrating a configuration of an adjustment of the device as shown in FIG. 4a.

FIG. 4d is a schematic diagram illustrating another configuration of the device as shown in FIG. 4a.

FIG. 4e is a schematic diagram illustrating an acquisition unit of the device as shown in FIG. 4a.

FIG. 4f is a schematic diagram illustrating a further configuration of the device as shown in FIG. 4a.

DETAILED DESCRIPTION

Figure 1:
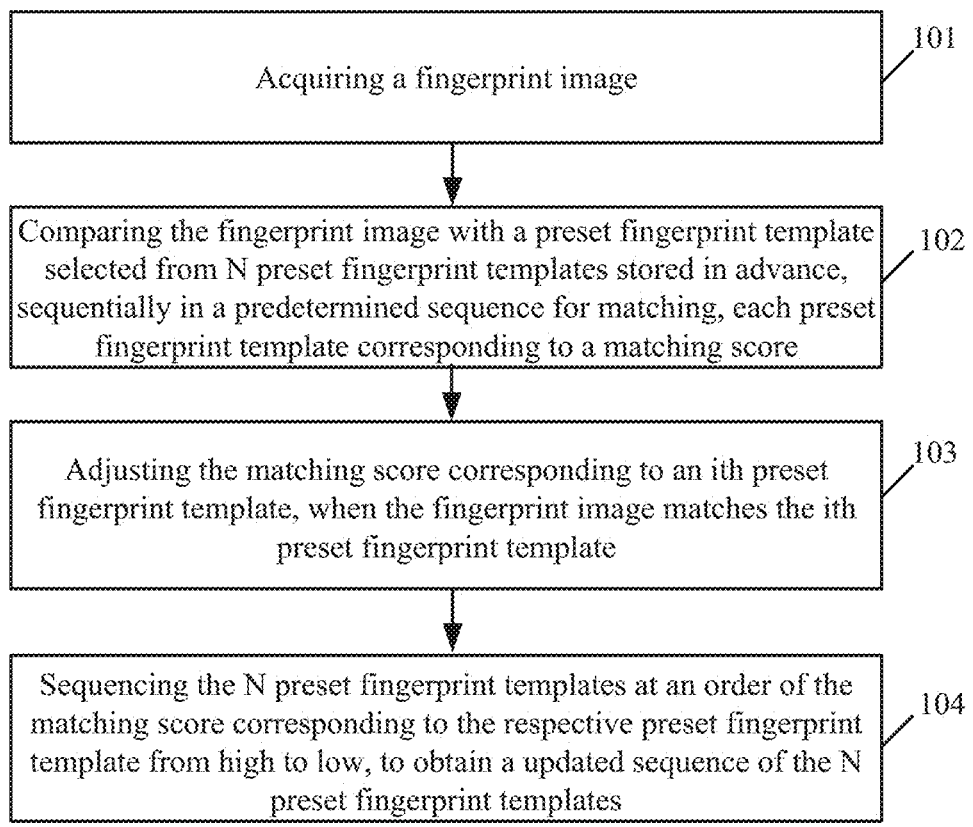
FIG. 1 is a flowchart illustrating a method for updating a sequence of fingerprir templates for matching according to Example One of the present disclosure.

Technical schemes of the present disclosure will be described clearly and completely in conjunction with accompanying drawings. The implementations illustrated below are merely part rather than all of the present disclosure. Any other implementation obtained by one skilled in the art based on the implementations described herein without creativity work should fall into the protective scope of the present disclosure.

Terminology used herein is for the purpose of describing particular embodiments only and is not intended to be limiting of the disclosure. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/". Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

The device described herein may include a mobile device or erminal, such as smart phone (for example, Android mobile phone, iOS mobile phone, Windows mobile phone), tablet computer, personal digital assistant (PDA), laptop, mobile Internet device (MID) or wearable device. The above devices are provided for exemplary purposes and should not be interpreted to limit the scope of the device described herein.

It is noted that the process of using a fingerprint to unlock may generally include the following steps: acquiring a fingerprint image; matching the fingerprint image with a preset fingerprint template; and performing an unlocking operation when a matching degree between the fingerprint image and the fingerprint template is larger than a fingerprint unlocking threshold, and prompting the user to press the fingerprint reader again when the matching degree between the fingerprint image and the fingerprint template is less than or equal to a fingerprint unlocking threshold. The unlocking operation may for example include: unlocking a screen of a mobile device to display a desktop when the mobile device is in a screen-off state; and unlocking a mobile device to log into an application or display an unlocked desktop or payment interface when the mobile device is in a screen-on state. A matching degree may be obtained when the fingerprint image matches any preset fingerprint template, which is obviously larger than the fingerprint unlocking threshold. The fingerprint unlocking threshold may be default or customized by the user. The unlocking is successful on when the matching degree is larger than the fingerprint unlocking threshold. It is obvious that the larger the fingerprint unlocking threshold is, the higher the security is, vice versa, the less the fingerprint unlocking threshold is, the lower the security is.

FIG. 1 is a flowchart illustrating a method for updating a sequence of fingerprint templates for matching according to Example One of the present disclosure. As shown in FIG. 1, in this example, the method for updating a sequence of fingerprint templates for matching may include the following steps.

Step 101, acquiring a fingerprint image.

During a process of a user pressing a fingerprint reader of a device, the fingerprint reader may collect a fingerprint image. The fingerprint image may be a fingerprint image collected by the fingerprint reader during a single pressing on the fingerprint reader, or a fingerprint image combined by multiple fingerprint images collected by the fingerprint reader during multiple pressing on the fingerprint reader.

Alternatively, the acquiring a fingerprint image may include the following steps:

11) closing a plurality of applications currently activated in the device when detecting that a fingerprint reader of the device is pressed;

12) determining number of threads corresponding to a current battery level based on a preset mapping relation between the battery level and the number of threads; and 13) setting a corresponding target thread based on the number of threads, and acquiring the fingerprint image based on the target thread.

At least one application currently running on the device may be closed, when detecting that the fingerprint reader is pressed. Specifically, N applications currently running may be determined, and matched to a preset application list. If M applications of the N applications are in the preset application list, the M applications may be closed, where M is a positive integer greater than 1 and less than or equal to N, and the preset application list is default or customized by the user. Further, the number of threads corresponding to the current battery level may be determined based on the preset mapping relation between the battery level and the number of threads, so that different number of threads may be used according to the different battery level. If the battery level is below a threshold, one thread may be used to acquire the fingerprint image. If the battery level is above the threshold, at least one thread the number of which corresponds to the battery level may be configured and used to acquire the fingerprint image. in this way, the fingerprint image can be acquired quickly, while avoiding excessive consumption of the battery level.

Step 102, comparing the fingerprint image with a preset fingerprint template selected from N preset fingerprint templates stored in a device in advance, sequentially in a predetermined sequence of the N preset fingerprint templates for matching, any one of the N preset fingerprint templates corresponding to a matching score, N being a positive integer greater than 1.

N preset fingerprint templates may be stored in the device in advance. Each preset fingerprint template may correspond to a matching score. When any preset fingerprint template is recorded, the matching score corresponding to the preset fingerprint template may be set as a fixed value, for example, 0. In this way, when a preset fingerprint template A is recorded initially, the corresponding matching score is 0. N preset fingerprint templates may be stored in the device, and the matching score corresponding to the respective preset fingerprint template is 0 when all the N preset fingerprint templates have not been used for fingerprint unlocking, so that the N preset fingerprint templates may be sequenced in a sequential order they are recorded in the device, and the N preset fingerprint templates may be numbered. The sequence of the numbered N preset fingerprint templates is an original sequence of the N preset fingerprint templates for matching.

Step 103, adjusting the matching score corresponding to an ith preset fingerprint template, when the fingerprint image matches the ith preset fingerprint template, the ith preset fingerprint template being one of the N preset fingerprint templates.

The unlocking operation may be performed when the fingerprint image matches any preset fingerprint template of the N preset fingerprint templates. When the fingerprint image matches the ith preset fingerprint template, the matching score corresponding to the ith preset fingerprint template may be adjusted, the ith preset fingerprint template being one of the N preset fingerprint templates.

The unlocking operation may be performed when the fingerprint image matches the ith preset fingerprint template, thereby an unlocked desktop may be displayed, or an application may be logged into, or even a payment may be made.

Alternatively, the above adjusting the matching score corresponding to the ith preset fingerprint template may include the following steps:

31) acquiring a current matching score corresponding to the ith preset fingerprint template; and 32) adding a preset fixed value and the current matching score together as a new matching score corresponding to the ith preset fingerprint template.

The preset fixed value may be default or customized by the user. For example, the preset fixed value may be 1. In this way, the current matching score corresponding to the ith preset fingerprint template may be acquired, and added with the preset fixed value, as the new matching score corresponding to the ith preset fingerprint template.

Alternatively, the above adjusting the matching score corresponding to the ith preset fingerprint template may include the following steps:

33) determining a matching degree between the fingerprint image and the ith preset fingerprint template;

34) calculating a difference between the matching degree and a fingerprint unlocking threshold; and 35) adjusting the matching score corresponding to the ith preset fingerprint template based on the difference.

When the fingerprint image matches the ith preset fingerprint template, the matching degree between the fingerprint image and the ith preset fingerprint template may be obtained, and the difference between the matching degree and the fingerprint unlocking threshold may be calculated, that is, the difference is calculated by subtracting the fingerprint unlocking threshold from the matching degree. A greater difference means a higher similarity between the fingerprint image and the preset fingerprint template, so that the matching score corresponding to the ith preset fingerprint template may be adjusted to a higher score. On the contrary, if the difference is small, the matching score corresponding to the ith preset fingerprint template may be slightly adjusted, or even not be adjusted.

Alternatively, the above adjusting the matching score corresponding to the ith preset fingerprint template may be described as follows.

A target adjustment score corresponding to the difference between the matching degree and the fingerprint unlocking threshold may be determined according to correspondence between the preset difference and the adjustment score. The current matching score corresponding to the ith preset fingerprint template and the target adjustment score may be added together as an adjusted matching score corresponding to the ith preset fingerprint template. For example, the correspondence between the difference and the target adjustment score may be expressed by a function $y=f(x)$, where x indicates the difference, y indicates the target adjustment score, and f may be a linear function or a nonlinear function. For another example, a plurality of levels for the difference may be set, each level corresponding to one adjustment score. For example, if there are three levels A, B and C, level A corresponding to an adjustment score A', level B corresponding to an adjustment score B', and level C corresponding to an adjustment score C', when the difference between the matching degree and the fingerprint unlocking threshold is at level A, the target adjustment score is N.

Step 104, sequencing the N preset fingerprint templates in a sequence of the matching score corresponding to the respective preset fingerprint template from high to low, to obtain a updated sequence of the N preset fingerprint templates, in which a next acquired fingerprint image is compared with the preset fingerprint template selected from N preset fingerprint templates sequentially for matching.

The matching score corresponding to the ith preset fingerprint template may be increased after adjusting the matching score corresponding to the ith preset fingerprint template, so the N preset fingerprint templates may be sequenced in a sequence of the matching score corresponding to the respective preset fingerprint template from high to low, to obtain a new sequence of the N preset fingerprint templates. The new sequence may be used for the next fingerprint unlocking.

For example, three preset fingerprint templates A, B and C may be provided, the preset fingerprint template A corresponding to a matching score A1, the preset fingerprint template B corresponding to a matching score B1, the preset fingerprint template C corresponding to a matching score C1, and the sequence of these preset fingerprint templates for matching being A, B and C. During the process of fingerprint unlocking, the three preset fingerprint templates may be compared with the fingerprint image collected from the user in the current sequence of these preset fingerprint templates for matching. The fingerprint image may be compared with the preset fingerprint template A firstly, and if fingerprint image does not match the preset fingerprint template A, the fingerprint image may be compared with the preset fingerprint template B. If the fingerprint image matches the preset fingerprint template B, the matching score corresponding to the preset fingerprint template B may be adjusted to B2. The matching scores A1, B2 and C1 may be sequenced in a sequence of the matching score from high to low. If A1 is larger than or equal to B2, the current sequence (A, B and C) may be maintained. And if A1 is less than B2, the sequence may be adjusted as B, A and C.

Alternatively, the matching score corresponding to the ith preset fingerprint template corresponds to an adjustment score, after the matching score corresponding to the ith preset fingerprint template has been adjusted. After the step 103 and before the step 104, the method may further include:

determining whether the adjustment score is larger than a target threshold score corresponding to the ith preset fingerprint template, and if so, proceeding to the step 104, otherwise not proceeding to the step 104.

The target threshold score corresponding to the ith preset fingerprint template is an absolute value of the difference between the matching score corresponding to the ith preset fingerprint template and the matching score corresponding to the previous preset fingerprint template. This is, if the adjustment score for the ith preset fingerprint template does not exceed the matching score corresponding to the previous preset fingerprint template, the step 104 may not be performed. Instead, if the adjustment score for the ith preset fingerprint template exceed the matching score corresponding to the previous preset fingerprint template, the step 104 may be performed. In this way, the number of updating the sequence of the fingerprint templates may be reduced, to reduce power consumption of the device.

According to the above method, device and computer-readable storage medium, when the fingerprint image matches any one of the preset fingerprint templates, the matching score corresponding to the matched preset fingerprint template may he adjusted, and the preset fingerprint templates may be sequenced in a sequence of the matching score corresponding to the respective preset fingerprint template from high to low to obtain a updated sequence of the preset fingerprint templates. A next acquired fingerprint image may be compared with the preset fingerprint template selected from preset fingerprint templates sequentially in the new sequence for matching, so the efficiency of using the fingerprint to unlock is improved.

Figure 2:
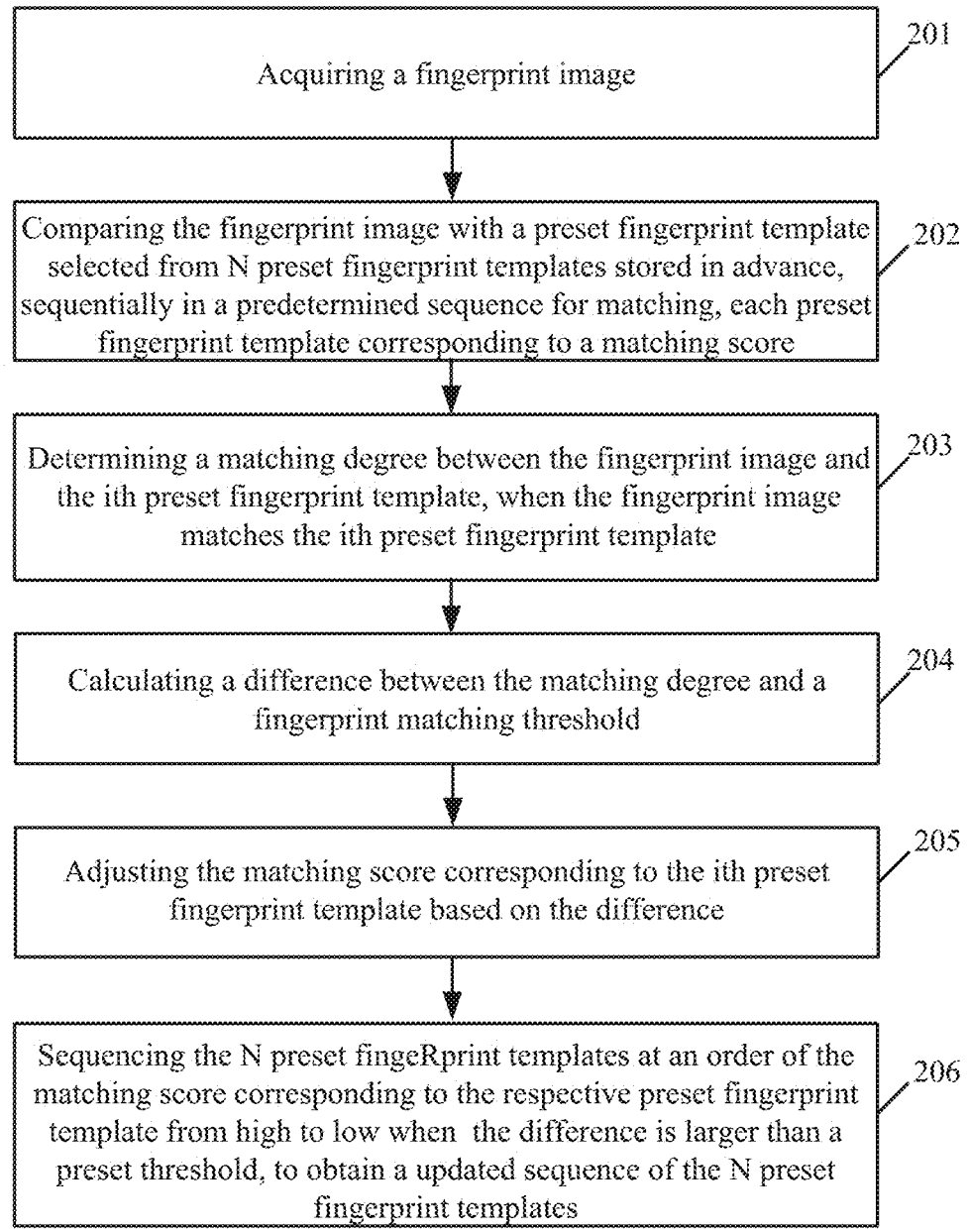
FIG. 2 is a flowchart illustrating a method for updating a sequence of fingerprint templates for matching according to Example Two of the present disclosure.

FIG. 2 is a flowchart illustrating a method for updating a sequence of fingerprint templates for matching according to Example Two of the present disclosure. As shown in FIG. 2, in this example, the method for updating a sequence of fingerprint templates for matching may include the following steps:

step 201, acquiring a fingerprint image;

step 202, comparing the fingerprint image with a preset fingerprint template selected from N preset fingerprint templates stored in a device in advance, sequentially in a predetermined sequence of the N preset fingerprint templates for matching, any one of the N preset fingerprint templates corresponding to a matching score, N being a positive integer greater than 1;

step 203, determining a matching degree between the fingerprint image and an ith preset fingerprint template, when the fingerprint image matches the ith preset fingerprint template, the ith preset fingerprint template being one of the N preset fingerprint templates;

step 204, calculating a difference between the matching degree and a fingerprint matching threshold;

step 205, adjusting the matching score corresponding to the ith preset fingerprint template based on the difference; and step 206, sequencing the N preset fingerprint templates in a sequence of the matching score corresponding to the respective preset fingerprint template from high to low when the difference is larger than a preset threshold, to obtain a updated sequence of the N preset fingerprint templates, in which a next acquired fingerprint image is compared with the preset fingerprint template selected from N preset fingerprint templates sequentially for matching.

The above steps 201-205 can refer to the above corresponding steps of the method as described in FIG. 1.

It may determine whether the difference is larger than the preset threshold. It so, it means a large adjustment has been made to the matching score corresponding to ith preset fingerprint template, so it is necessary to adjust the sequence of the preset fingerprint templates. The preset threshold may be default or customized by the user.

In this way, the number of updating the sequence of the fingerprint templates may be reduced, to reduce power consumption of the device, to improve the user experience.

Figure 3:
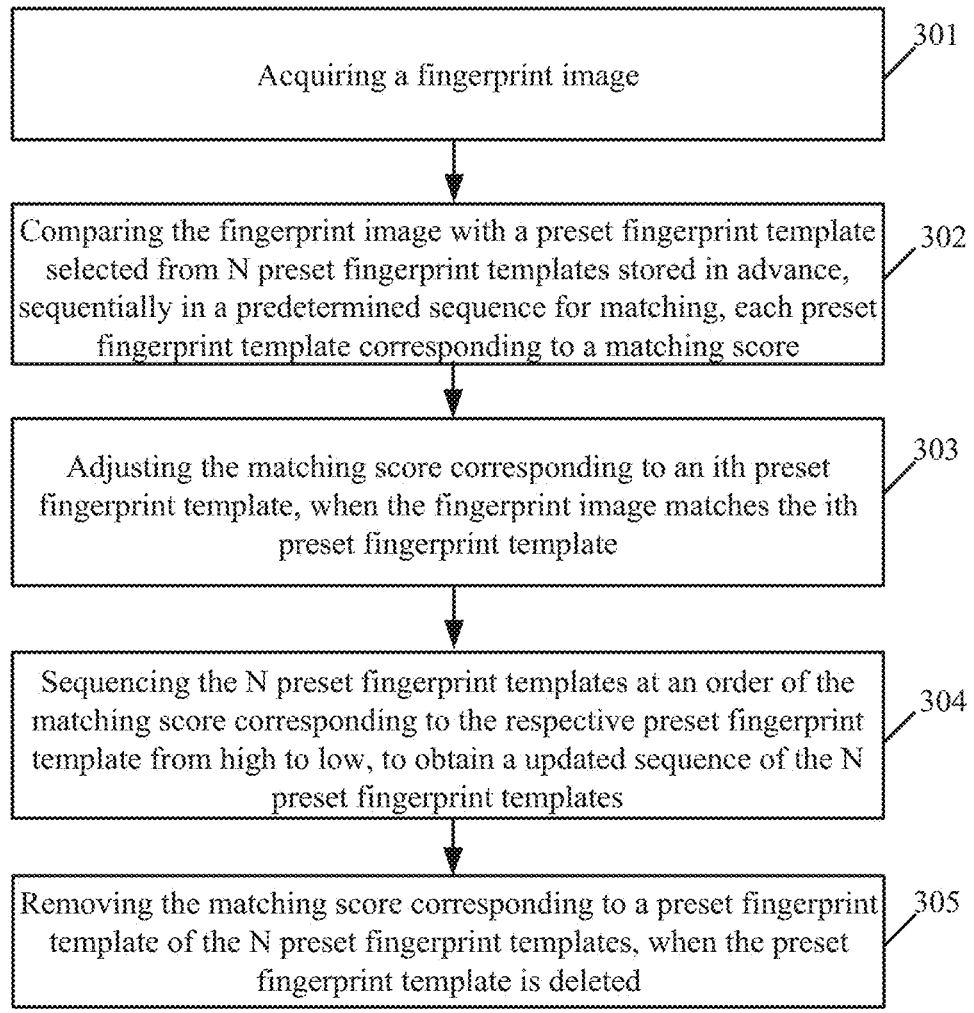
FIG. 3 is a flowchart illustrating a method for updating a sequence of fingerprint templates for matching according to Example Three of the present disclosure.

FIG. 3 is a flowchart illustrating a method for updating a sequence of fingerprint templates for matching according to Example Three of the present disclosure. As shown in FIG. 3, in this example, the method for updating a sequence of fingerprint templates for matching may include the following steps:

step 301, acquiring a fingerprint image;

step 302, comparing the fingerprint image with a preset fingerprint template selected from N preset fingerprint templates stored in a device in advance, sequentially in a predetermined sequence of the N preset fingerprint templates for matching, any one of the N preset fingerprint templates corresponding to a matching score, N being a positive integer greater than 1;

step 303, adjusting the matching score corresponding to an ith preset fingerprint template, when the fingerprint image matches the ith preset fingerprint template, the ith preset fingerprint template being one of the N preset fingerprint templates;

step 304, sequencing the N preset fingerprint templates in a sequence of the matching score corresponding to the respective preset fingerprint template from high to low, to obtain a updated sequence of the N preset fingerprint templates, in which a next acquired fingerprint image is compared with the preset fingerprint template selected from N preset fingerprint templates sequentially for matching; and step 305, removing the matching score corresponding to a preset fingerprint template of the N preset fingerprint templates, when the preset fingerprint template is deleted.

The above steps 301-304 can refer to the above corresponding steps of the thod as described in FIG. 1.

If any one of the N preset fingerprint templates is deleted, the matching score corresponding the deleted preset fingerprint template may be removed, that is, if one preset fingerprint template has been deleted, the remaining N−1 preset fingerprint templates may be sequenced in a sequence of the matching score corresponding to the respective preset fingerprint template from high to low, to obtain a new sequence of the N−1 preset fingerprint templates for matching.

Alternatively, after the step 304, a new preset fingerprint template may be recorded, and the matching score corresponding to the new preset fingerprint template may be set. The N+1 preset fingerprint templates may be sequenced in a sequence of the matching score corresponding to the respective preset fingerprint template from high to low, to obtain a new sequence of the N−1 preset fingerprint templates for matching.

In this example, the preset fingerprint template may be deleted, and the matching score corresponding to the deleted preset fingerprint template may be removed. Then the sequence of the preset fingerprint templates for matching may be updated to improve the efficiency of using the fingerprint to unlock, and to improve the user experience.

Figure 4A:
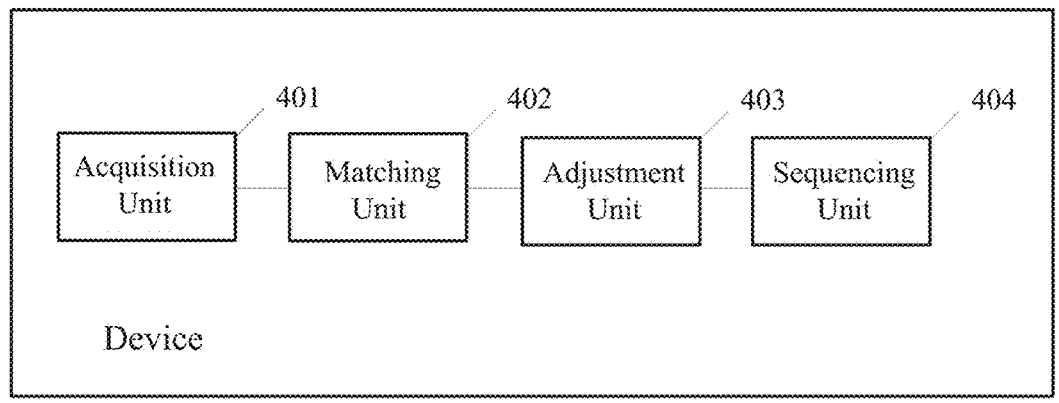
FIG. 4a is a schematic diagram illustrating a configuration of a device for updating a sequence of fingerprint templates for matching according to Example One of the present disclosure.

FIG. 4a is a schematic diagram illustrating a configuration of a device for updating a sequence of fingerprint templates for matching according to Example One of the present disclosure. As shown in FIG. 4a, the device may include an acquisition unit 401, a matching unit 402, an adjustment unit 403, and a sequencing unit 404.

The acquisition unit 401 is configured to acquire a fingerprint image; the matching unit 402 is configured to compare the fingerprint image with a preset fingerprint template selected from N preset fingerprint templates stored in a device in advance, sequentially in a predetermined sequence of the N preset fingerprint templates for matching, any one of the N preset fingerprint templates corresponding to a matching score, N being a positive integer greater than 1; the adjustment unit 403 is configured to adjust the matching score corresponding to an ith preset fingerprint template, when the fingerprint image matches the ith preset fingerprint template, the ith preset fingerprint template being one of the N preset fingerprint templates; and the sequencing unit 404 is configured to sequence the N preset fingerprint templates in a sequence of the matching score corresponding to the respective preset fingerprint template from high to low, to obtain a updated sequence of the N preset fingerprint templates, in which a next acquired fingerprint image is compared with the preset fingerprint template selected from N preset fingerprint templates sequentially for matching.

Figure 4B:
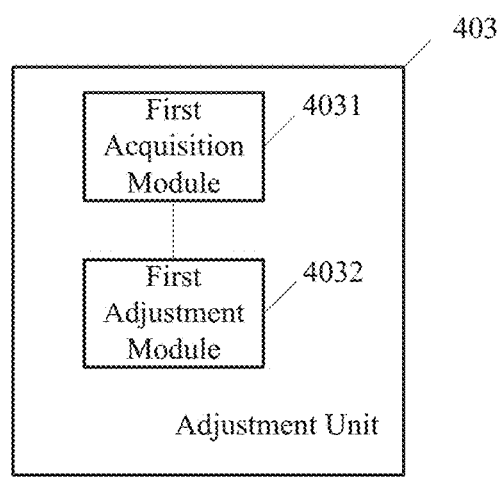

Alternatively, as shown in FIG. 4b, the adjustment unit 403 may include a first acquisition module 4031 and a first adjustment module 4032. The first acquisition module is configured to acquire a current matching score corresponding to the ith preset fingerprint template; and the first adjustment module is configured to add a preset fixed value and the current matching score together as a new matching score corresponding to the ith preset fingerprint template.

Figure 4C:
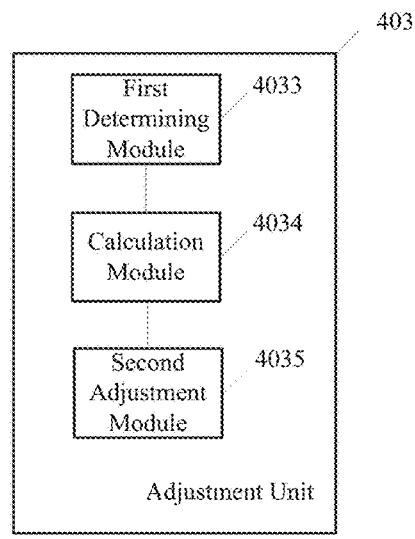

Alternatively, as shown in FIG. 4c, the adjustment unit 403 may include a first determining module 4034, a calculation module 4034 and a second adjustment module 4035. The first determining module 4034 is configured to determine a matching degree between the fingerprint image and the ith preset fingerprint template; the calculation module 4034 is configured to calculate a difference between the matching degree and a fingerprint matching threshold; and the second adjustment module 4035 is configured to adjust the matching score corresponding to the ith preset fingerprint template based on the difference.

Figure 4D:
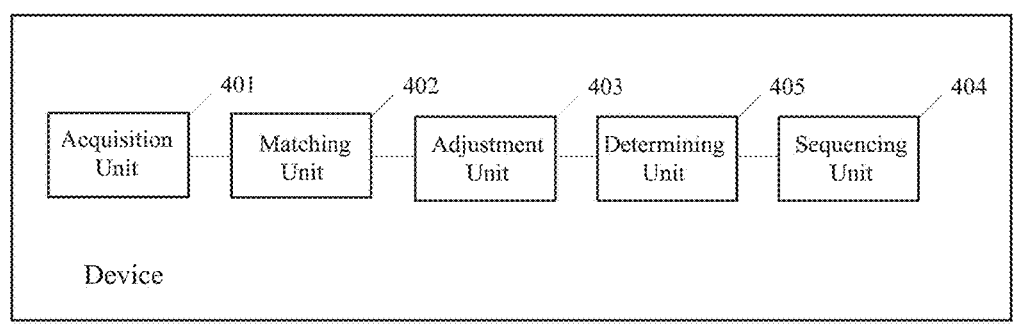

Alternatively, as shown in FIG. 4d, the device as described in FIG. 4a may further include a determining unit 405. The determining unit 405 is configured to determine whether the difference is larger than a preset threshold after the matching score corresponding to an ith preset fingerprint template has been adjusted by the adjustment unit 403, and if so, sequencing, by the sequencing unit 404, the N preset fingerprint templates in the sequence of the matching score corresponding to the respective preset fingerprint template from high to low to obtain a new sequence of the N preset fingerprint templates.

Figure 4E:
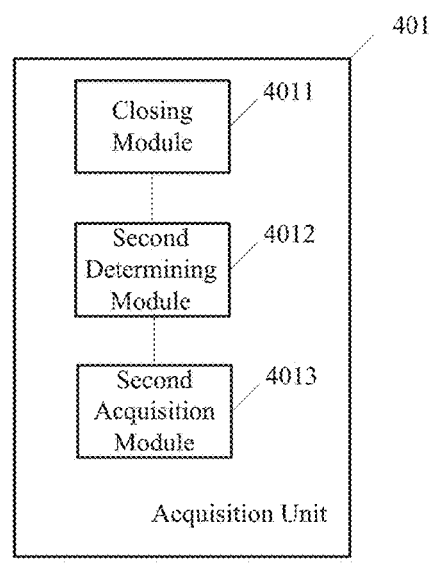

Alternatively, as shown in FIG. 4e, the acquisition module 401 may include a closing module 4011, a second determining module 4012 and a second acquisition module 4013. The closing module 4011 is configured to close at least one application currently running on the device when detecting that a fingerprint reader of the device is pressed; the second determining module 4012 is configured to determine number of threads corresponding to a current battery level based on a preset mapping relation between the battery level and the number of threads; and the second acquisition module 4013 is configured to set a corresponding target thread based on the number of threads, and acquire the fingerprint image based on the target thread.

Figure 4F:
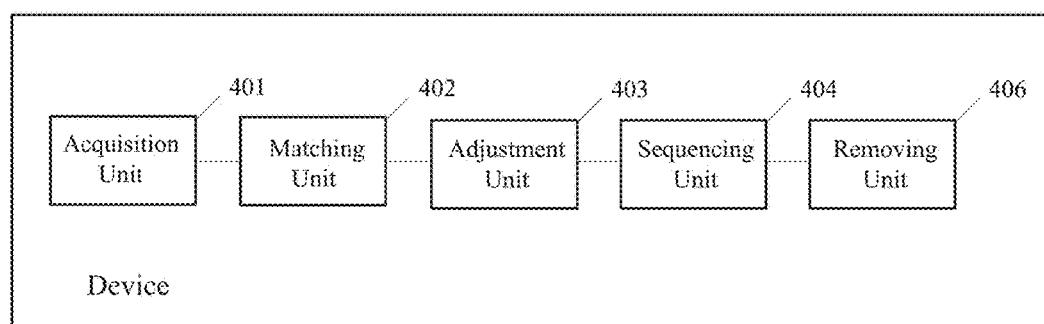

Alternatively, as shown in FIG. 4f, the device as described in FIG. 4a may further include a removing unit 406. The removing unit 406 is configured to remove the matching score corresponding to a preset fingerprint template of the N preset fingerprint templates, when the preset fingerprint template is deleted, after the sequencing unit 404 has obtained the new sequence of the N preset fingerprint templates by sequencing the N preset fingerprint templates in the sequence of the matching score corresponding to the respective preset fingerprint template from high to low.

The device according to the present disclosure may be configured to: acquire a fingerprint image; compare the fingerprint image with a preset fingerprint template selected from N preset fingerprint templates stored in a device in advance, sequentially in a predetermined sequence of the N preset fingerprint templates for matching, any one of the N preset fingerprint templates corresponding to a matching score, N being a positive integer greater than 1; adjust the matching score corresponding to an ith preset fingerprint template, when the fingerprint image matches the ith preset fingerprint template, the ith preset fingerprint template being one of the N preset fingerprint templates; and sequence the N preset fingerprint templates in a sequence of the matching score corresponding to the respective preset fingerprint template from high to low, to obtain a updated sequence of the N preset fingerprint templates, in which a next acquired fingerprint image is compared with the preset fingerprint template selected from N preset fingerprint templates sequentially for matching. When the fingerprint image matches any one of the preset fingerprint templates, the matching score corresponding to the matched preset fingerprint template may be adjusted, and the preset fingerprint templates may be sequenced in a sequence of the matching score corresponding to the respective preset fingerprint template from high to low to obtain a updated sequence of the preset fingerprint templates. A next acquired fingerprint image may be compared with the preset fingerprint template selected from preset fingerprint templates sequentially in the new sequence for matching. In this way, the preset fingerprint template corresponding to a higher matching score may be selected preferentially for matching, and the efficiency of using the fingerprint to unlock may be improved.

Figure 5:
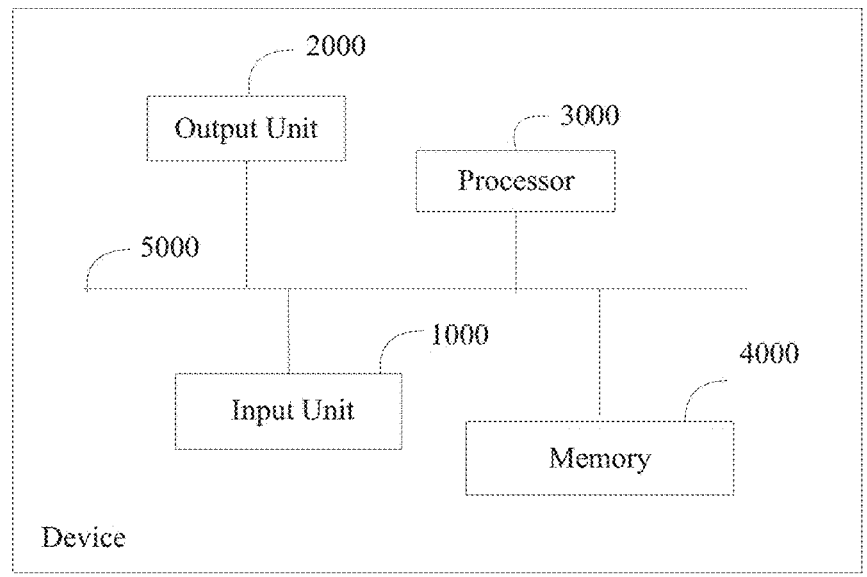
FIG. 5 is a schematic diagram illustrating a device for updating a sequence of fingerprint templates for matching according to Example Two of the present disclosure.

FIG. 5 is a schematic diagram illustrating a device for updating a sequence of fingerprint templates for matching according to Example Two of the present disclosure. In this example, the device may include at least one input unit 1000, at least one output unit 2000, at least one processor 3000, such as CPU, and a memory 4000. The input unit 1000, the output unit 2000, the processor 3000 and the memory 4000 are connected together via a bus 5000.

The input unit 1000 may be a touch panel, physical button or mouse.

The output unit 2000 may be a display.

The memory 4000 may be a high-speed RAM memory, or a non-volatile memory, such as disk memory. The memory 4000 may be configured to store a set of program code. The input unit 1000, the output unit 2000 and the processor 3000 may be configured to call the program code stored in the memory 4000 to perform the following operations.

The processor 3000 may be configured to:

acquire a fingerprint image;

compare the fingerprint image with a preset fingerprint template selected from N preset fingerprint templates stored in a device in advance, sequentially in a predetermined sequence of the N preset fingerprint templates for matching, any one of the N preset fingerprint templates corresponding to a matching score, N being a positive integer greater than 1;

adjust the matching score corresponding to an ith preset fingerprint template, when the fingerprint image matches the ith preset fingerprint template, the ith preset fingerprint template being one of the N preset fingerprint templates; and sequence the N preset fingerprint templates in a sequence of the matching score corresponding to the respective preset fingerprint template from high to low, to obtain a new sequence of the N preset fingerprint templates, in which a next acquired fingerprint image is compared with the preset fingerprint template selected from N preset fingerprint templates sequentially for matching.

Alternatively, for adjusting the matching score corresponding to an ith preset fingerprint template, the processor 3000 may be further configured to:

acquire a current matching score corresponding to the ith preset fingerprint template; and add a preset fixed value and the current matching score together as a new matching score corresponding to the ith preset fingerprint template.

Alternatively, for adjusting the matching score corresponding to an ith preset fingerprint template, the processor 3000 may be further configured to:

determine a matching degree between the fingerprint image and the ith preset fingerprint template;

calculate a difference between the matching degree and a fingerprint matching threshold; and adjust the matchingscore corresponding to the preset fingerprint template based on the difference.

Alternatively, after adjusting the matching score corresponding to the ith preset fingerprint template, and before sequencing the N preset fingerprint templates in the sequence of the matching score corresponding to the respective preset fingerprint template from high to low to obtain the new sequence of the N preset fingerprint templates, the processor 3000 may be further configured to:

determine whether the difference is larger than a preset threshold, and if so, sequencing the N preset fingerprint templates in the sequence of the matching score corresponding to the respective preset fingerprint template from high to low to obtain a updated sequence of the N preset fingerprint templates.

Alternatively, for acquiring a fingerprint image, the processor 3000 may be further configured to:

close at least one application currently running on the device when detecting that a fingerprint reader of the device is pressed;

determine number of threads corresponding to a current battery level based on a preset mapping relation between the battery level and the number of threads;

set a corresponding target thread based on the number of threads; and acquire the fingerprint image based on the target thread.

Alternatively, after sequencing the N preset fingerprint templates in the sequence of the matching score corresponding to the respective preset fingerprint template from high to low to obtain the new sequence of the N preset fingerprint templates, the processor 3000 may be further configured to:

remove the matching score corresponding to a preset fingerprint template of the N preset fingerprint templates, when the preset fingerprint template is deleted.

Figure 6:
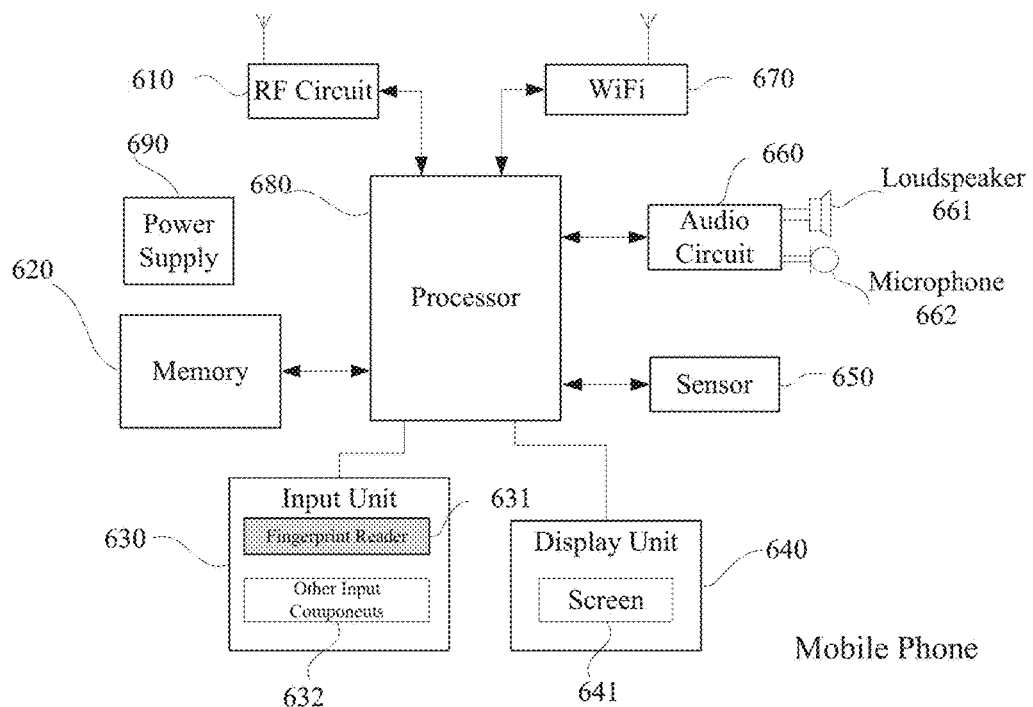
FIG. 6 is a schematic diagram illustrating a mobile phone according to one embodiment of the present disclosure.

As discussed, different approaches can be implemented in various devices in accordance with the described embodiments. For example, FIG. 6 illustrates an example of a device for implementing aspects in accordance with various embodiments, The device may include mobile phone, tablet computer, personal digital assistant (PDA), point of sales (POS), on-board computer or other electronic devices. As will be appreciated, a mobile phone is used for purposes of explanation, different devices may be used, as appropriate, to implement various embodiments.

FIG. 6 is a schematic diagram illustrating a part of a mobile phone according to one embodiment of the present disclosure. As shown in FIG. 6, the mobile phone may include a radio frequency (RF circuit) 610, a memory 620, an input unit 630, a display unit 640, a sensor 650, an audio circuit 660, a wireless fidelity (Wi-Fi) module 670, a processor 680 and a power supply 690. It is understood by those skilled in the art that the configuration of the mobile phone as shown in FIG. 6 should not be interpreted to limit the mobile phone, more or less components may be included, some components may be combined, and a different arrangement of the components may be used.

Various components of the mobile phone will be detailed in the following description taken in conjunction with FIG. 6.

The RF circuit 610 may be configured to receive and transmit data in the process of sending and receiving messages or in the communication process, particularly, receive the downlink messages from the base station and send it to the processor for processing, and moreover send uplink data of the mobile phone to the base station. The RF circuit 610 generally includes, but is not limited to an antenna, at least one amplifier, a transceiver, a coupler, a low noise amplifier (LNA), and a duplexer. In addition, the RF circuit 610 may communicate with the Internet or other devices via wireless communication. The above wireless communication may adopt any communication standard or protocol, including but not limited to GSM (Global System for Mobile communication), GPRS (General Packet Radio Service), CDMA (Code Division Multiple Access), WCDMA (Wideband Code Division Multiple Access), LTE (Long Term Evolution), E-mail and SMS (Short Messaging Service).

The memory 620 may be configured to store software programs and modules, and the processor 680 implement various applications and data processing of the mobile phone by running the software programs and modules stored in the memory 620. The memory 620 may include a program storage area and a data storage area. The program storage area may be configured to store an operating system, and application programs required by at least one functions (for example, a voice broadcast function and an image display function), etc. The data storage area may be configured to store data (for example, audio data and contacts) created according to the use of the mobile phone, etc. In addition, the memory 620 may include a high speed random access memory, and can also include a non-transitory memory, for example, at least one magnetic disk memory, flash memory, or any other transitory solid-state memory.

The input unit 630 may be configured to receive input numerical or character information, and to generate key signals associated with user settings and function control of the mobile phone. In detail, the input unit 630 may include a fingerprint reader 631 and any other input components 632. The fingerprint reader 631 may be configured to collect the fingerprint data of a user who presses a fingertip on the fingerprint reader 631. Alternatively, the fingerprint reader 631 may be selected from the group consisting of optical fingerprint reader, capacitive fingerprint reader and RF fingerprint reader. For capacitive fingerprint reader, it may include a sensing electrode (abnormality sensing electrode and normality sensing electrode) and a signal processing circuit (such as amplifying circuit, noise suppression circuit, digital-analog conversion circuit and so on) coupled to the sensing electrode. Besides the fingerprint reader 631, the input unit 630 may further include other input components 632. In detail, other input components 632 may include but be not limited to one or more of a physical keyboard, a function key (for example, a volume control key, an on-off key), a trackball, a mouse, and an operating lever.

The display unit 640 may be configured to display information input by the user or information provided to the user and various menus of the mobile phone. The display unit 640 may include a display screen 641, which may be in a form of LCD (Liquid Crystal Display) or OLED (Organic Light-Emitting Diode). Although the fingerprint reader 631 and the display screen 641 perform the input and output functions of the mobile phone respectively as two separate components in FIG. 6, the fingerprint reader 631 and the display screen 641 may be integrated to perform both the input and output functions in other embodiments.

The mobile phone may further include at least one sensor 650, such as optical sensor, motion sensor and other sensors. The optical sensor may include an environment light sensor and a proximity sensor, in which the environment light sensor may be used to adjust the brightness of the display screen 641 according to ambient brightness, and the proximity sensor may be configured to turn off the display screen 641 and/or backlight when the mobile phone moves to a position near the ear. As a kind of the motion sensor, the accelerometer may be configured to detect acceleration values in respective directions (generally, three axes). The mobile phone may include other sensors, such as gyroscope, barometer, hygrometer, thermometer, infrared sensor and so on.

The audio circuit 660, the loudspeaker 661 and the microphone 662 can provide an audio interface between the user and the mobile phone. The audio circuit 660 may be configured to convert the received audio data to electric signals, and transmit them to the loudspeaker 661. The loudspeaker 661 may be configured to convert the electric signals to sound signals for outputting. On the other hand, the microphone 662 may be configured to convert the collected sound signals to electric signals, and the audio circuit 660 may be further configured to receive the electric signals and converts them to audio data, and then output the audio data to the processor 680 for processing. Then, the audio data may be sent to another mobile phone by the RF circuit 610, or the audio data may be output to the memory 620 for further processing.

WIFI belongs to a short distance wireless transmission technology. The mobile phone can facilitate the user's sending and receiving emails, browsing webpages and accessing streaming medium via the WIFI module, which provides the wireless wideband Internet access to the user. In addition, the WIFI module can be omitted according to needs without changing the essence of the present disclosure.

The processor 680 is the control center of the mobile phone, which connects various components of the mobile phone via various interfaces and wires, and executes various functions of the mobile phone and processes data by running or executing software programs and/or modules stored in the memory 62.0 and calling data stored in the memory 620, so as to monitor the whole mobile phone. Alternatively, the processor 680 may include one or more processing unit. Preferably, the processor 680 may be integrated with an application processor and a modulation-demodulation processor, in which the application processor principally deals with the operating system, the user interface and the applications, while the modulation-demodulation processor principally deals with wireless communication. It should be appreciated that the modulation-demodulation processor may not be integrated into the processor 680.

The mobile phone may further include a power supply 690 (for example, a battery) for supplying power to each component. Preferably, the power supply can be logically connected to the processor 680 via a power management system, such that charging and discharging management and power consumption management may be implemented by the power management system.

The mobile phone may further include a camera (not shown), a Bluetooth module (not shown), etc.

It should be appreciated that each step described in the embodiments as shown in FIGS. 1-3 can be implemented based on the configuration of the mobile phone.

It also should be appreciated that each unit or module described in the embodiments as shown in FIGS. 4a-4f and 5 can be implemented based on the configuration of the mobile phone.

Also described herein is a computer-readable storage medium. The computer-readable storage medium is configured to store computer-readable program code when executed on a data-processing apparatus, adapted to perform the methods for updating a sequence of fingerprint templates for matching as described in the above embodiments.

The computer-readable storage medium includes computer storage medium and communication medium, among which the communication medium includes any medium used to transmit computer program from one direction to another place. The storage medium can be any available medium that is accessible to the computer. The computer-readable storage medium includes but not limited to read only memory (ROM), random access memory (RAM), electrically erasable programmable read-only memory (EEPROM), compact disc read-only memory (CD-ROM) or other CD storage medium, disk storage medium, magnetic storage devices, or any other medium which can be used to carry or store program code in a desired structural form of instruction or data and is accessible to a computer.

In addition, the computer-readable medium includes any form of connection. For example, if software is transmitted from websites, servers, or other remote sources through coaxial cable, optical fiber cable, twisted-pair wires, digital subscriber line (DSL), or wireless technologies such as Infrared, wireless, microwave and so on, then coaxial cable, optical fiber cable, twisted-pair wires, DSL, or wireless technologies such as Infrared, wireless, microwave should be included in the definition of storage medium. As used herein, disk or disc includes CD, laser disc, DVD, Floppy disk and Blue-ray Disc, usually, disk copies data via magnetic, while disc copies data by laser optically. Combinations of the mediums described above all into the protective scope of the computer-readable medium of the present disclosure either.

Although various illustrative embodiments are described above, any of a number of changes may be made to various embodiments without departing from the scope of the invention as described by the claims. For example, the sequence in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

Those skilled in the art should be appreciated that the present disclosure can be implemented through hardware, firmware, or a combination thereof. When implemented via software, the above mentioned functions can be stored in a computer-readable medium or can be transmitted as one or more instruction or code on the computer-readable storage medium. Additionally, in the implementations of the present disclosure, each functional unit can be integrated in one processing unit or can be separated physically, or two or more units can be integrated into one unit. The integrated units described above can be implemented in the form of hardware or software.

Although various illustrative embodiments are described above, any of a number of changes may be made to various embodiments without departing from the scope of the invention as described by the claims. For example, the sequence in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

CLAUSES

Clause 1. A method for updating a sequence of fingerprint templates for matching, comprising:

acquiring a fingerprint image;

matching the fingerprint image with N preset fingerprint templates pre-stored in a. terminal, each preset fingerprint template of the N preset fingerprint templates having a matching score, N being a positive integer greater than 1;

adjusting the matching score of an ith preset fingerprint template, when the matching between the fingerprint image and the ith preset fingerprint template is successful, the ith preset fingerprint template being any one of the N preset fingerprint templates; and sequencing the N preset fingerprint templates in a descending order of the matching scores to obtain a sequence of the N preset fingerprint templates for matching configured for a next fingerprint unlocking.

Clause 2. The method of clause 1, wherein the adjusting the matching score corresponding to the ith preset fingerprint template includes:

acquiring a first matching score of the ith preset fingerprint template; and adding a preset fixed value to the first matching score to obtain a second matching score of the ith preset fingerprint template.

Clause 3. The method of clause 1, wherein the adjusting the matching score of the ith preset fingerprint template includes:

determining a matching value between the fingerprint image and the ith preset fingerprint template;

calculating a difference between the matching value and a fingerprint matching threshold; and adjusting the matching score of the ith preset fingerprint template based on the difference.

Clause 4. The method of clause 3, after adjusting the matching score of the ith preset fingerprint template, and before sequencing the N preset fingerprint templates in a descending order of the matching scores to obtain the sequence of the N preset fingerprint templates for matching, further comprising:

determining whether the difference is larger than a preset threshold, and if so, sequencing the N preset fingerprint templates in a descending order of the matching scores to obtain the sequence of the N preset fingerprint templates for matching.

Clause 5. The method of any one of clauses 1-4, wherein the acquiring a fingerprint image includes:

closing at least one application currently running on the device when detecting that a fingerprint reader of the device is pressed;

determining a number of threads corresponding to a current battery level based on a preset mapping relation between the battery level and the number of threads;

setting a corresponding target thread based on the number of threads; and acquiring the fingerprint image based on the target thread.

Clause 6. The method of any one of clauses 1-4, after sequencing the N preset fingerprint templates in a descending order of the matching scores to obtain the sequence of the N preset fingerprint templates for matching, further comprising:

removing the matching score of a preset fingerprint template of the N preset fingerprint templates, when the preset fingerprint template is deleted.

Clause 7. A terminal, comprising:

an acquisition unit, configured to acquire a fingerprint image;

a matching unit, configured to match the fingerprint image with N preset fingerprint templates pre-stored in a terminale, each preset fingerprint template in the N preset fingerprint templates having a matching score, N being a positive integer greater than 1;

an adjustment unit, configured to adjust the matching score of an ith preset fingerprint template, when the matching between the fingerprint image and the ith preset fingerprint template is successful, the ith preset fingerprint template being any one of the N preset fingerprint templates; and a sequencing unit, configured to sequence the N preset fingerprint templates in a descending order of the matching scores to obtain a sequence of the N preset fingerprint templates for matching configured for a next fingerprint unlocking.

Clause 8. The terminal of clause 7, wherein the adjustment unit includes:

a first acquisition module, configured to acquire a first matching score of the ith preset fingerprint template; and a first adjustment module, configured to add a preset fixed value to the first matching score to obtain a second matching score of the ith preset fingerprint template.

Clause 9. The terminal of clause 7, wherein the adjustmentunit includes:

a first determining module, configured to determine a matching value between the fingerprint image and the ith preset fingerprint template;

a calculation module, configured to calculate a difference between the matching value and a fingerprint matching threshold; and a second adjustment module, configured to adjust the matching score of the ith preset fingerprint template based on the difference.

Clause 10. The terminal of clause 9, further comprising:

a determining unit, configured to determine whether the difference is larger than a preset threshold after the matching score of the ith preset fingerprint template has been adjusted, and if so, sequencing, by the sequencing unit, the N preset fingerprint templates in the descending order of the matching scores to obtain the sequence of the N preset fingerprint templates for matching.

Clause 11. The terminal of any one of clauses 7-10, wherein the acquisition unit includes:

a closing module, configured to close at least one application currently running on the device when detecting that a fingerprint reader of the device is pressed;

a second determining module, configured to determine a number of threads corresponding to a current battery level based on a preset mapping relation between the battery level and the number of threads; and a second acquisition module, configured to set a corresponding target thread based on the number of threads, and acquire the fingerprint image based on the target thread.

Clause 12, The terminal of any one of clauses 7-10, further comprising:

a removing unit, configured to remove the matching score of a preset fingerprint template of the N preset fingerprint templates, when the preset fingerprint template is deleted, after the sequencing unit has obtained the sequence of the N preset fingerprint templates for matching by sequencing the N preset fingerprint templates in the descending order of the matching scores.

Clause 13. A terminal, comprising:

a processor; and a memory, wherein, the processor configured to perform the method of any one of clause 1-6 by calling code or instructions in the memory.

What is claimed is:

1. A method for updating a sequence of fingerprint templates for matching, applied to a terminal, comprising:
    closing at least one application currently running on a device when detecting that a fingerprint reader of the device is pressed;
    determining a number of threads corresponding to a current battery level based on a preset mapping relation between the battery level and the number of threads;
    setting a corresponding target thread based on the number of threads;
    acquiring the fingerprint image based on the target thread;
    comparing the fingerprint image with a preset fingerprint template selected from N preset fingerprint templates pre-stored in a device, sequentially in a predetermined sequence of the N preset fingerprint templates for matching, any one of the N preset fingerprint templates having a matching score, and N being a positive integer greater than 1;
    adjusting the matching score of an ith preset fingerprint template, when the fingerprint image matches the ith preset fingerprint template, the ith preset fingerprint template being one of the N preset fingerprint templates; and
    sequencing the N preset fingerprint templates in a descending order of the matching scores to obtain a updated sequence of the N preset fingerprint templates, wherein a next acquired fingerprint image is compared with the preset fingerprint template selected from N preset fingerprint templates sequentially in the updated sequence for matching.

2. The method of claim 1, wherein the adjusting the matching score corresponding to the ith preset fingerprint template includes:
    acquiring a current matching score of the ith preset fingerprint template; and
    adding a preset fixed value to the current matching score to obtain a new matching score corresponding to the ith preset fingerprint template.

3. The method of claim 1, wherein the adjusting the matching score corresponding to the ith preset fingerprint template includes:
    determining a matching degree between the fingerprint image and the ith preset fingerprint template;

calculating a difference between the matching degree and a fingerprint matching threshold; and adjusting the matching score of the ith preset fingerprint template based on the difference.

4. The method of claim 3, wherein the adjusting the matching score corresponding to the ith preset fingerprint template based on the difference includes:

acquiring a current matching score of the ith preset fingerprint template;

determining a target adjustment score based on the difference; and adding the target adjustment score to the current matching score to get a new matching score corresponding to the ith preset fingerprint template.

5. The method of claim 3, after the adjusting the matching score corresponding to the ith preset fingerprint template, and before the sequencing the N preset fingerprint templates in the sequence of the matching score corresponding to the respective preset fingerprint template from high to low to obtain the updated sequence of the N preset fingerprint templates, further comprising:

determining whether the difference is larger than a preset threshold, and if so, sequencing the N preset fingerprint templates in the descending order of the matching scores to obtain a updated sequence of the N preset fingerprint templates.

6. The method of claim 1, wherein after the sequencing the N preset fingerprint templates in the descending order of the matching scores to obtain the updated sequence of the N preset fingerprint templates, further comprising:

removing the matching score corresponding to a preset fingerprint template of the N preset fingerprint templates, when the preset fingerprint template is deleted.

7. A device is provided, comprising:

one or more computer processors;

a memory; and one or more programs, wherein the one or more programs are stored in the memory and configured to be executed by the one or more processors, the one or more programs including:

an acquisition unit, configured to acquire a fingerprint image;

a matching unit, configured to compare the fingerprint image with a preset fingerprint template selected from N preset fingerprint templates stored in a device in advance, sequentially in a predetermined sequence of the N preset fingerprint templates for matching, any one of the N preset fingerprint templates corresponding to a matching score, N being a positive integer greater than 1;

an adjustment unit, configured to adjust the matching score corresponding to an ith preset fingerprint template, when the fingerprint image matches the ith preset fingerprint template, the ith preset fingerprint template being one of the N preset fingerprint templates; and a sequencing unit, configured to sequence the N preset fingerprint templates in a sequence of the matching score corresponding to the respective preset fingerprint template from high to low, to obtain a updated sequence of the N preset fingerprint templates, wherein a next acquired fingerprint image is compared with the preset fingerprint template selected from N preset fingerprint templates sequentially in the updated sequence for matching;

wherein the acquisition unit includes:

a closing module, configured to close at least one application currently running on the device when detecting that a fingerprint reader of the device is pressed;

a determining module, configured to determine a number of threads corresponding to a current battery level based on a preset mapping relation between the battery level and the number of threads; and an acquisition module, configured to set a corresponding target thread based on the number of threads, and acquire the fingerprint image based on the target thread.

8. The device of claim 7, wherein the adjustment unit includes:

an acquisition module, configured to acquire a current matching score corresponding to the ith preset fingerprint template; and an adjustment module, configured to add a preset fixed value and the current matching score together as a new matching score corresponding to the ith preset fingerprint template.

9. The device of claim 7, wherein the adjustment unit includes:

a matching degree determining module, configured to determine a matching degree between the fingerprint image and the ith preset fingerprint template;

a calculation module, configured to calculate a difference between the matching degree and a fingerprint matching threshold; and an adjustment module, configured to adjust the matching score corresponding to the ith preset fingerprint template based on the difference.

10. The device of claim 9, wherein the adjustment unit further includes:

an acquisition module, configured to acquire a current matching score corresponding to the ith preset fingerprint template; and a target adjustment score determining module, configured to determine a target adjustment score based on the difference;

wherein the adjustment module is further configured to add the target adjustment score to the current matching score to get a new matching score corresponding to the ith preset fingerprint template.

11. The device of claim 9, wherein the one or more programs further includes:

a determining unit, configured to determine whether the difference is larger than a preset threshold after the matching score corresponding to an ith preset fingerprint template has been adjusted by the adjustment unit, and if so, sequencing, by the sequencing unit, the N preset fingerprint templates in the descending order of the matching scores to obtain a updated sequence of the N preset fingerprint templates.

12. The device of claim 7, wherein the one or more programs further includes:

a removing unit, configured to remove the matching score corresponding to a preset fingerprint template of the N preset fingerprint templates, when the preset fingerprint template is deleted, after the sequencing unit has obtained the new sequence of the N preset fingerprint templates by sequencing the N preset fingerprint templates in the descending order of the matching scores.

13. A non-transitory computer-readable storage medium for storing computer executable instructions configured to control a computer to execute a method for updating a sequence of fingerprint templates for matching, the method including:

closing at least one application currently running on the device when detecting that a fingerprint reader of the device is pressed;

determining a number of threads corresponding to a current battery level based on a preset mapping relation between the battery level and the number of threads;

configuring a corresponding target thread based on the number of threads;

acquiring the fingerprint image based on the target thread;

comparing the fingerprint image with a preset fingerprint template selected from N preset fingerprint templates pre-stored in a device, sequentially in a predetermined sequence of the N preset fingerprint templates for matching, any one of the N preset fingerprint templates corresponding to a matching score, N being a positive integer greater than 1;

adjusting the matching score corresponding to an ith preset fingerprint template, when the fingerprint image matches the ith preset fingerprint template, and the ith preset fingerprint template being one of the N preset fingerprint templates; and sequencing the N preset fingerprint templates in a descending order of the matching scores, to obtain a updated sequence of the N preset fingerprint templates, wherein a next acquired fingerprint image is compared with the preset fingerprint template selected from N preset fingerprint templates sequentially in the updated sequence for matching.

14. The non-transitory computer-readable storage medium of claim 13, wherein the adjusting the matching score corresponding to the ith preset fingerprint template includes:

acquiring a current matching score corresponding to the ith preset fingerprint template; and adding a preset fixed value to the current matching score to obtain a new matching score corresponding to the ith preset fingerprint template.

15. The non-transitory computer-readable storage medium of claim 13, wherein the adjusting the matching score corresponding to the ith preset fingerprint template includes:

determining a matching degree between the fingerprint image and the ith preset fingerprint template;

calculating a difference between the matching degree and a fingerprint matching threshold; and adjusting the matching score corresponding to the ith preset fingerprint template based on the difference.

16. The non-transitory computer-readable storage medium of claim 15, wherein after adjusting the matching score corresponding to an ith preset fingerprint template, and before sequencing the N preset fingerprint templates in a descending order of the matching scores to obtain a updated sequence of the N preset fingerprint templates, further comprising:

determining whether the difference is larger than a preset threshold, and if so, sequencing the N preset fingerprint templates in the descending order of the matching scores to obtain a updated sequence of the N preset fingerprint templates.

17. The non-transitory computer-readable storage medium of claim 13, wherein after the sequencing the N preset fingerprint templates in a descending order of the matching scores to obtain a updated sequence of the N preset fingerprint templates, further comprising:

removing the matching score corresponding to a preset fingerprint template of the N preset fingerprint templates, when the preset fingerprint template is deleted.

* * * * *